May 17, 1927.
W. AUBERLIN
1,629,197
AIRSHIP ANCHORAGE
Filed Jan. 18, 1926
2 Sheets-Sheet 2
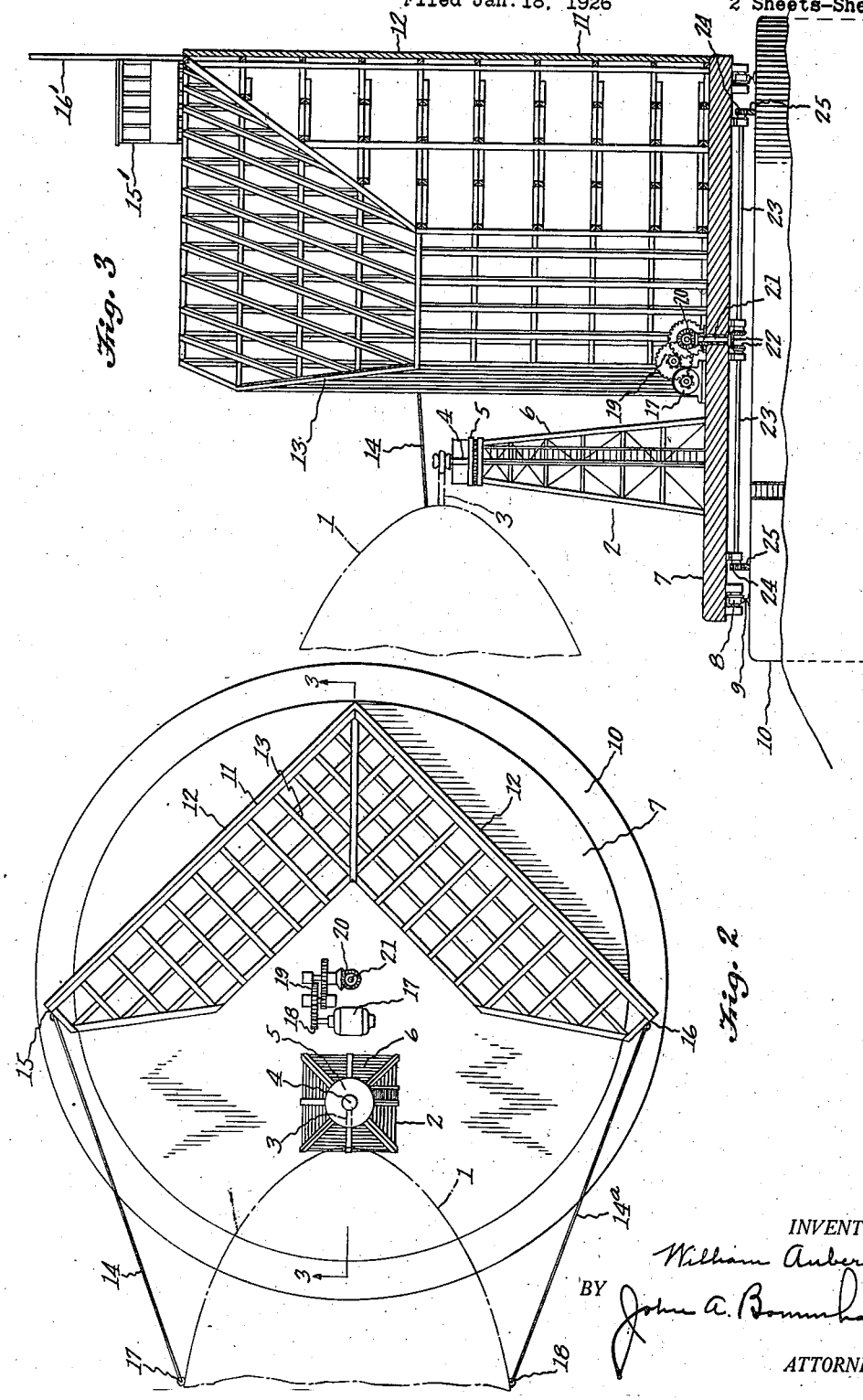
INVENTOR.
William Auberlin
BY John A. Bommhardt
ATTORNEY.

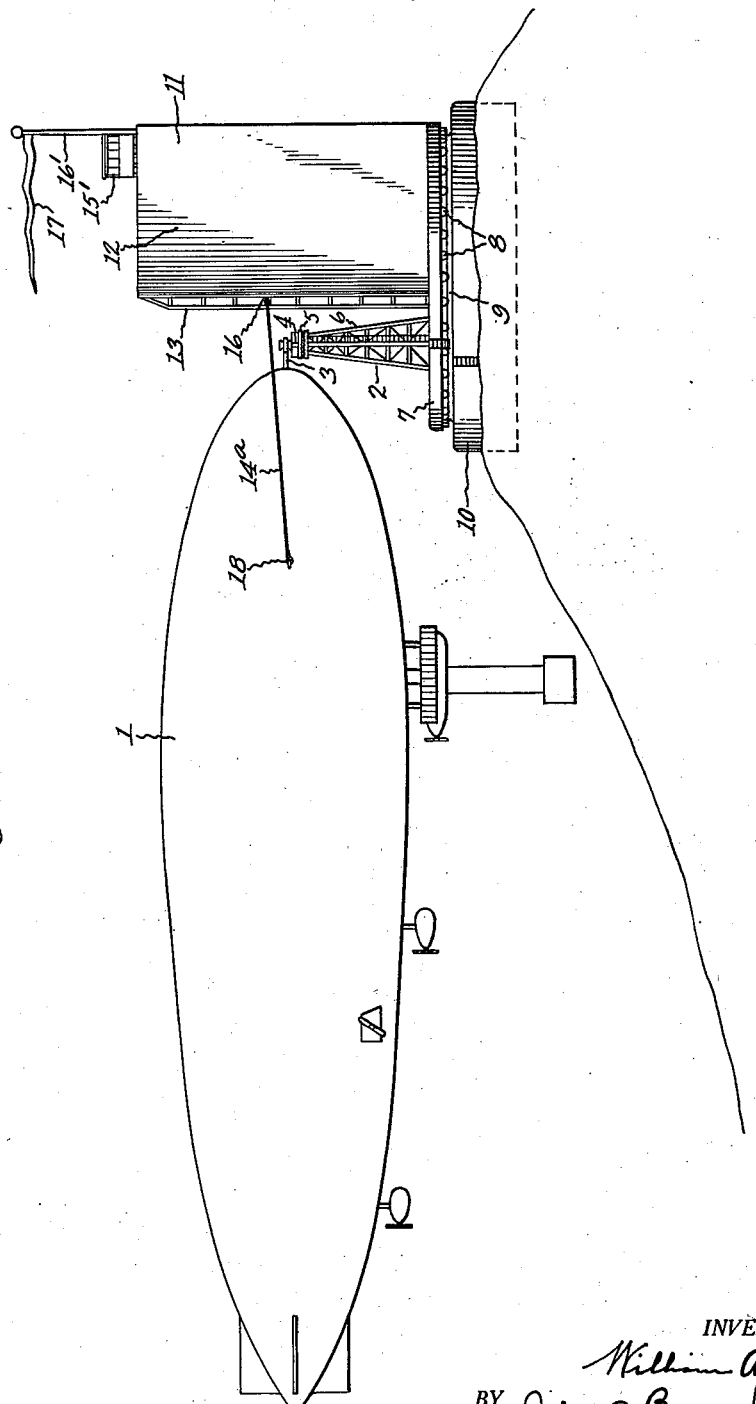

Patented May 17, 1927.

1,629,197

UNITED STATES PATENT OFFICE.

WILLIAM AUBERLIN, OF NORTHFIELD, OHIO.

AIRSHIP ANCHORAGE.

Application filed January 18, 1926. Serial No. 82,022.

This invention relates to improvements in airship anchorage and more particularly to means for securely mooring, trimming and sheltering airships under any weather conditions providing reliability of commercial schedule and eliminating the necessity of expensive sheds with large attendant landing crews and providing a more secure anchorage than is afforded by the ordinary non-protecting mooring mast.

The present types of airship sheds and mooring masts do not permit an airship to maintain a commercial schedule as an airship cannot enter or be removed from its shed when a fifteen mile or over wind is blowing across the entrance and the ordinary mooring mast does not provide a secure anchorage in severe thunderstorms or in gales accompanied by gusts varying rapidly in direction.

Other objects of my invention will be hereinafter pointed out.

In the drawings:—

Fig. 1 shows an airship moored to my improved mooring mast.

Fig. 2 is an enlarged plan view with the control house removed and the airship nose shown in dot and dash lines.

Fig. 3 is a partial vertical section on line 3—3 of Fig. 2.

Referring to the drawings 1 indicates an airship moored to a mooring mast indicated generally at 2 by means of a suitable mooring hook 3 securely engaging the mast post 4 of rotatable platform 5 mounted on top of a mast 6 of any suitable structure mounted on and eccentric to the axis of turntable 7 carried by wheels 8 on circular track 9 supported by foundation 10.

A V-shaped wind break or shield indicated at 11 comprising smooth boarded sides 12 secured to bracing structure 13, is mounted on turntable 7, its apex disposed opposite to mast 2 across the turntable center at the peripheral edge. Guy cables 14 and 14ª secured at the wind break ends 15 and 16 are connected to the airship sides at 17 and 18.

A control and observation house 15' and pennant pole 16' are mounted on top of the wind break. A pennant 17 for indicating the direction of the wind is flown from pole 16'.

Means for turning the turntable is provided by observation house controlled reversable electric motor 17 mounted thereon, driving through pinion 18, reduction gears 19, bevel gears 20, vertical shaft 21, bevel gears 22, horizontal shafts 23 mounted on the bottom side of turntable 7 and carrying pinions 24 meshing with a stationary circular rack 25 mounted on foundation 10.

To moor the airship, the wind break is turned with its apex, into the wind by the operator in the control house and the approaching airship with its nose trimmed into the wind is moored to the sheltered mooring mast and guy cables 14 and 14ª are attached bracing and controlling lateral movement of the airship. When the wind shifts the mooring structure is turned accordingly, trimming the wind break and airship nose into the wind. The wind break protects the mooring mast and airship from high winds and heavy gales allowing the airship to ride safely behind and the guy cables brace against gusts varying rapidly in direction. Turntable motor controls may be located at other convenient points.

My improved mooring mast eliminates the difficult maneuvering necessary with a shed and simplifies the maneuvering with an ordinary mooring mast.

While I have shown one form of my invention, it is obvious that many modifications may be made in the details of construction without departing from the essentials of the invention. I therefore do not limit myself to such details.

I claim:—

1. An airship anchorage comprising a rotary platform, a mooring mast mounted thereon, and a windshield mounted on the platform beside the mooring mast, the mast being located at one side of the center of rotation of the platform and the windshield being located at the opposite side of the said center.

2. An airship anchorage comprising a rotary platform, a mooring mast mounted thereon, and a V-shaped windshield mounted on the platform, the mast being located at one side of the center of rotation of the platform and the apex of the windshield being positioned substantially diametrically opposite thereto.

3. An airship anchorage comprising a rotatable platform, a mooring mast mounted thereon, an angular windshield also mounted on the platform, and guy cables attached to opposite ends of the windshield and adapted for connection to opposite sides of the airship when the nose of the latter is attached to the mooring mast.

In testimony whereof, I do affix my signature.

WILLIAM AUBERLIN.